United States Patent
Braganca et al.

(10) Patent No.: US 9,305,579 B2
(45) Date of Patent: *Apr. 5, 2016

(54) FABRICATION OF SIDE-BY-SIDE SENSORS FOR MIMO RECORDING

(71) Applicant: HGST Netherlands B.V., Amsterdam (NL)

(72) Inventors: Patrick M. Braganca, San Jose, CA (US); Yang Li, San Jose, CA (US); Jordan A. Katine, Mountain View, CA (US); Neil Smith, San Jose, CA (US); Hsin-Wei Tseng, Cupertino, CA (US)

(73) Assignee: HGST NETHERLANDS B.V., Amsterdam (NL)

( * ) Notice: Subject to any disclaimer, the term of this patent is extended or adjusted under 35 U.S.C. 154(b) by 115 days.

This patent is subject to a terminal disclaimer.

(21) Appl. No.: 14/156,265

(22) Filed: Jan. 15, 2014

(65) Prior Publication Data

US 2015/0199985 A1   Jul. 16, 2015

(51) Int. Cl.
*G11B 5/39*   (2006.01)

(52) U.S. Cl.
CPC ............ *G11B 5/3948* (2013.01); *G11B 5/3932* (2013.01)

(58) Field of Classification Search
CPC ... G11B 5/3945; G11B 5/3948; G11B 5/3958
See application file for complete search history.

(56) References Cited

U.S. PATENT DOCUMENTS

| | | | |
|---|---|---|---|
| 5,644,456 A | 7/1997 | Smith et al. | |
| 5,696,654 A | 12/1997 | Gill et al. | |
| 5,721,008 A | 2/1998 | Huang et al. | |
| 5,766,780 A | 6/1998 | Huang et al. | |
| 5,783,460 A | 7/1998 | Han et al. | |
| 6,204,071 B1 | 3/2001 | Ju et al. | |
| 6,473,275 B1 | 10/2002 | Gill et al. | |
| 6,717,780 B2 | 4/2004 | Hiramoto et al. | |
| 7,027,268 B1* | 4/2006 | Zhu et al. ............. | G11B 5/3932 360/314 |
| 9,082,435 B1* | 7/2015 | Braganca et al. .... | G11B 5/3948 |
| 2013/0286511 A1* | 10/2013 | Edelman et al. ..... | G11B 5/3932 360/128 |
| 2014/0022839 A1* | 1/2014 | Park et al. ............ | G11C 11/161 365/171 |
| 2014/0055884 A1* | 2/2014 | Edelman et al. ..... | G11B 5/3977 360/125.04 |

OTHER PUBLICATIONS

Guzman, J. I. et al. "Design and Fabrication of Unshielded Dual-Element Horizontal MR Heads"; IEEE Transactions on Magnetics; vol. 30. Issue 6, Nov. 1994, Abstract Only.

* cited by examiner

*Primary Examiner* — Craig A. Renner
(74) *Attorney, Agent, or Firm* — Patterson & Sheridan, LLP

(57) ABSTRACT

The embodiments of the present invention relate to a method for forming a magnetic read head having side by side sensors. The method includes depositing a pinned layer, a barrier layer and a free layer over a shield, and removing portions of the pinned layer, barrier layer and free layer to expose portions of the shield. A bias material is deposited over the exposed shield. An opening is formed in the free layer to expose the barrier layer, and an insulative material is deposited into the opening. The resulting side by side sensors each has its own free layer separated by the insulative nonmagnetic material. The side by side sensors share the pinned layer.

6 Claims, 8 Drawing Sheets

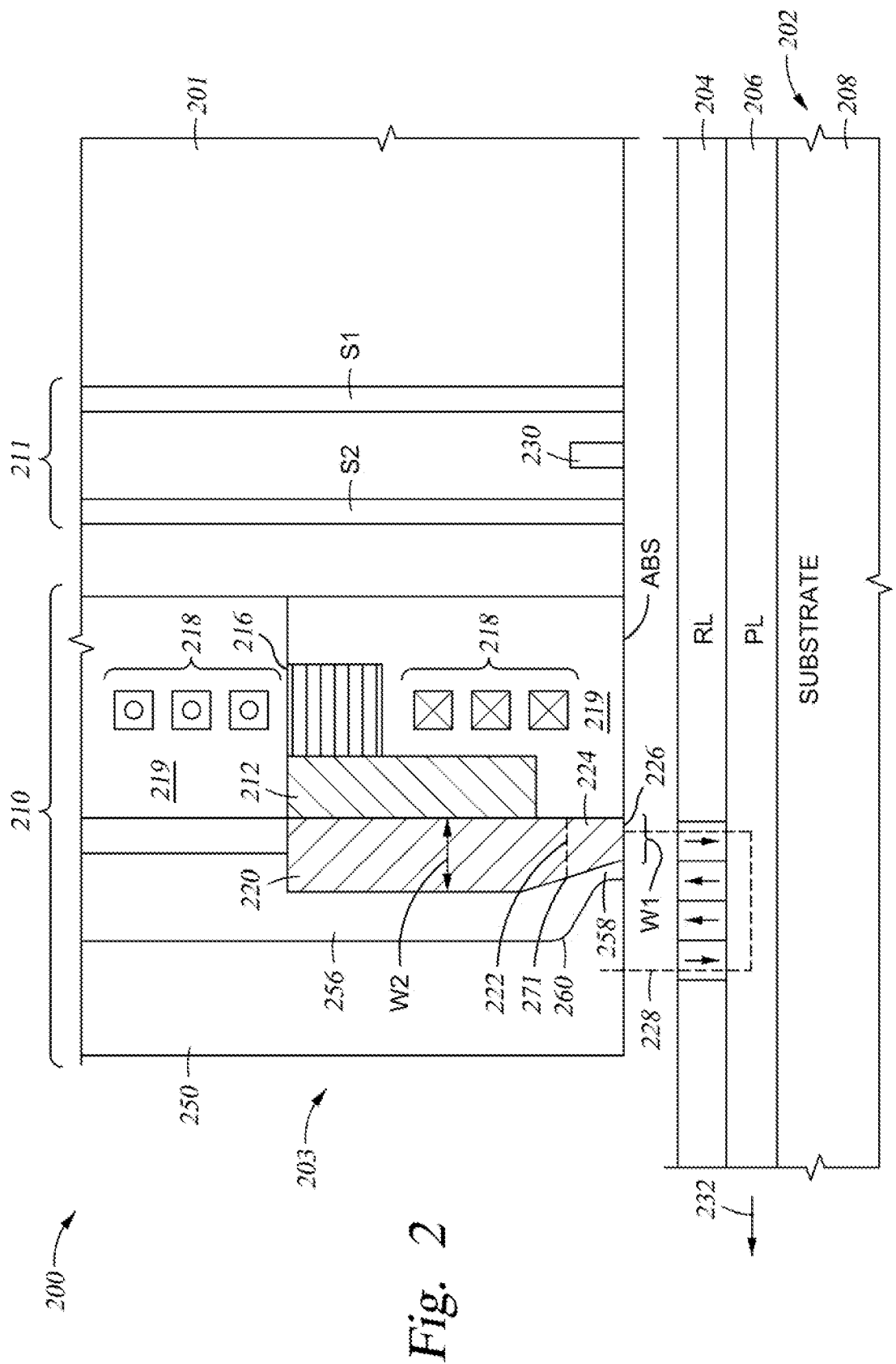

FABRICATION OF SIDE-BY-SIDE SENSORS FOR MIMO RECORDING

BACKGROUND

1. Field

Embodiments of the present invention generally relate to a magnetic read head for use in a hard disk drive.

2. Description of the Related Art

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider towards the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing, the write and read heads are employed for writing magnetic impressions to and reading magnetic signal fields from the rotating disk. The read and write heads are connected to processing circuitry that operates according to a computer program to implement the writing and reading functions.

The read head typically utilizes a spin valve sensor, also referred to as a magnetoresistive (MR) sensor. The sensor at the ABS typically includes a barrier layer sandwiched between a pinned layer and a free layer. The magnetization of the pinned layer is pinned perpendicular to the ABS and the magnetic moment of the free layer is located parallel to the ABS, but free to rotate in response to external magnetic fields.

In order to respond to the demand for even higher density recording in recent years, the effective track width of magnetoresistive sensors has been made narrower, but this has caused the element resistance to increase, the noise to increase, and sensitivity to reduce, and has produced the separate issue that it is difficult to increase the sensitivity. Therefore, there is a need for an improved magnetic head and method of manufacture.

SUMMARY OF THE INVENTION

The embodiments of the present invention relate to a method for forming a magnetic read head with side by side sensors. The method includes depositing a pinned layer, a barrier layer and a free layer over a shield, and removing portions of the pinned layer, barrier layer and free layer to expose portions of the shield. A bias material is deposited over the exposed shield. An opening is formed in the free layer to expose the barrier layer, and an insulative nonmagnetic material is deposited into the opening. The resulting side by side sensors each has its own free layer separated by the insulative nonmagnetic material. The side by side sensors share the pinned layer.

In one embodiment, a magnetic read head for multiple input multiple output recording is disclosed. The magnetic read head includes side by side sensors including a shield, a pinned layer disposed over a first portion of the shield, a barrier layer disposed over the pinned layer, a first free layer disposed over a first portion of the barrier layer, a second free layer disposed over a second portion of the barrier layer, an insulative nonmagnetic material disposed over a third portion of the barrier layer, a first lead layer disposed over the first free layer and a second lead layer disposed over the second free layer.

In another embodiment, a method for forming a magnetic read head for multiple input multiple output recording is disclosed. The method includes depositing a pinned layer over a shield, depositing a barrier layer over the pinned layer, depositing a first free layer over the barrier layer, removing portions of the pinned layer, barrier layer and first free layer to expose portions of the shield, depositing a bias material over the exposed portions of the shield, depositing a hard mask layer over the bias material and the first free layer, forming an opening in the hard mask layer and the first free layer, depositing an insulative nonmagnetic material in the opening, and removing the hard mask layer. A portion of the insulative nonmagnetic material protrudes out of a top surface, and the protruded portion of the insulative nonmagnetic material has a first side and a second side. The method further includes forming a first lead layer on the top surface adjacent the first side and a second lead layer on the top surface adjacent the second side.

In another embodiment, a method for forming a magnetic read head for multiple input multiple output recording is disclosed. The method includes depositing a pinned layer over a shield, depositing a barrier layer over the pinned layer, depositing a first free layer over the barrier layer, removing portions of the pinned layer, barrier layer and first free layer to expose portions of the shield, depositing a bias material over the exposed portions of the shield, depositing a first lead layer over the bias material and the first free layer, forming an opening in the hard mask layer, the first lead layer and the first free layer, depositing an insulative nonmagnetic material in the opening, and removing the hard mask layer and a portion of the insulative nonmagnetic material that protrudes above the first lead layer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments in any field involving magnetic sensors.

FIG. 2 is a side view of a read/write head and magnetic disk of the disk drive of FIG. 1, according to one embodiment of the invention.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The embodiments of the present invention relate to a method for firming a magnetic read head with side by side sensors. The method includes depositing a pinned layer, a barrier layer and a free layer over a shield, and removing portions of the pinned layer, barrier layer and free layer to expose portions of the shield. A bias material is deposited over the exposed shield. An opening is formed in the free layer to expose the barrier layer, and an insulative material is deposited into the opening. The resulting side by side sensors each has its own free layer separated by the insulative nonmagnetic material. The side by side sensors share the pinned layer.

Figure 1:
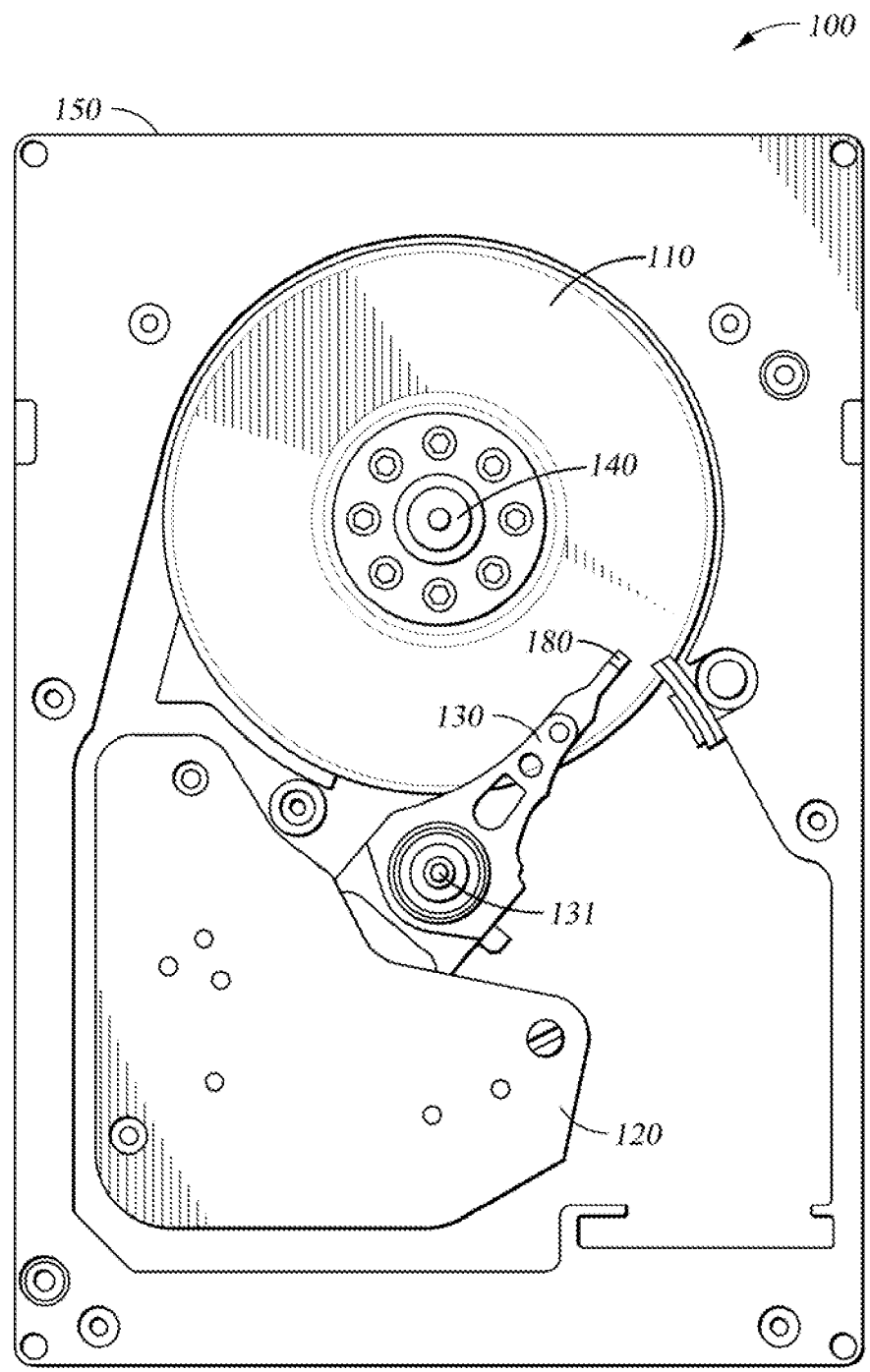
FIG. 1 illustrates an exemplary magnetic disk drive, according to an embodiment of the invention.

FIG. 1 illustrates a top view of an exemplary hard disk drive (HDD) 100, according to an embodiment of the invention. As illustrated, HDD 100 may include one or more magnetic disks 110, actuator 120, actuator arms 130 associated with each of the magnetic disks 110, and spindle motor 140 affixed in a chassis 150. The one or more magnetic disks 110 may be arranged vertically as illustrated in FIG. 1. Moreover, the one or more magnetic disks may be coupled with the spindle motor 140.

Magnetic disks 110 may include circular tracks of data on both the top and bottom surfaces of the disk. A magnetic head 180 mounted on a slider may be positioned on a track. As each disk spins, data may be written on and/or read from the data track. Magnetic head 180 may be coupled to an actuator arm 130 as illustrated in FIG. 1. Actuator arm 130 may be configured to swivel around actuator axis 131 to place magnetic head 180 on a particular data track.

FIG. 2 is a fragmented, cross-sectional side view through the center of a read/write head 200 mounted on a slider 201 and facing magnetic disk 202. The read/write head 200 and magnetic disk 202 may correspond to the magnetic head 180 and magnetic disk 110, respectively in FIG. 1. In some embodiments, the magnetic disk 202 may be a "dual-layer" medium that includes a perpendicular magnetic data recording layer (RL) 204 on a "soft" or relatively low-coercivity magnetically permeable underlayer (PL) 206 formed on a disk substrate 208. The read/write head 200 includes an ADS, a magnetic write head 210 and a magnetic read head 211, and is mounted such that the ABS is facing the magnetic disk 202. In FIG. 2, the disk 202 moves past the write head 210 in the direction indicated by the arrow 232, so the portion of slider 201 that supports the read/write head 200 is often called the slider "trailing" end 203.

The magnetic read head 211 is a magneto-resistive (MR) read head that includes a MR sensing element 230 located between MR shields S1 and S2, which are composed of a highly permeable and magnetically soft material such as permalloy. The distance between S1 and S2, which is the sensor thickness, defines the read gap of the read head. The MR sensing element 230 may be one or more side by side sensors which are described in detail below. The RL 204 is illustrated with perpendicularly recorded or magnetized regions, with adjacent regions having magnetization directions, as represented by the arrows located in the RL 204. The magnetic fields of the adjacent magnetized regions are detectable by the MR sensing element 230 as the recorded bits.

The write head 210 includes a magnetic circuit made up of a main pole 212 and a yoke 216. The write head 210 also includes a thin film coil 218 shown in the section embedded in non-magnetic material 219 and wrapped around yoke 216. In an alternative embodiment, the yoke 216 may be omitted, and the coil 218 may wrap around the main pole 212. A write pole 220 is magnetically connected to the main pole 212 and has an end 226 that defines part of the ABS of the magnetic write head 210 facing the outer surface of disk 202.

Write pole 220 is a flared write pole and includes a flare point 222 and a pole tip 224 that includes an end 226 that defines part of the ABS. The flare may extend the entire height of write pole 220 (i.e., from the end 226 of the write pole 220 to the top of the write pole 220), or may only extend from the flare point 222, as shown in FIG. 2. In one embodiment the distance between the flare point 222 and the ABS is between about 30 nm and about 150 nm.

The write pole 220 includes a tapered surface 271 which increases a width of the write pole 220 from a first width W1 at the ABS to a second width W2 away from the ABS. In one embodiment, the width W1 may be between around 60 nm and 200 nm, and the width W2 may be between around 120 nm and 350 nm. While the tapered region 271 is shown with a single straight surface in FIG. 2, in alternative embodiment, the tapered region 271 may include a plurality of tapered surface with different taper angles with respect to the ABS.

The tapering improves magnetic performance. For example, reducing the width W1 at the ABS may concentrate a magnetic field generated by the write pole 220 over desirable portions of the magnetic disk 202. In other words, reducing the width W1 of the write pole 220 at the ABS reduces the probability that tracks adjacent to a desirable track are erroneously altered during writing operations.

While a small width of the write pole 220 is desired at the ABS, it may be desirable to have a greater width of the write pole 220 in areas away from the ABS. A larger width W2 of the write pole 220 away from the ABS may desirably increase the magnetic flux to the write pole 220, by providing a greater thickness of the write pole 220 in a direction generally parallel to the ABS. In operation, write current passes through coil 218 and induces a magnetic field (shown by dashed line 228) from the write pole 220 that passes through the RL 204 (to magnetize the region of the RL 204 beneath the write pole 220), through the flux return path provided by the PI. 206, and back to an upper return pole 250. In one embodiment, the greater the magnetic flux of the write pole 220, the greater is the probability of accurately writing to desirable regions of the RL 204.

FIG. 2 further illustrates one embodiment of the upper return pole or magnetic shield 250 that is separated from write pole 220 by a nonmagnetic gap layer 256. In some embodiments, the magnetic shield 250 may be a trailing shield wherein substantially all of the shield material is on the trailing end 203. Alternatively, in some embodiments, the magnetic shield 250 may be a wrap-around shield wherein the shield covers the trailing end 203 and also wraps around the sides of the write pole 220. As FIG. 2 is a cross section through the center of the read/write head 200, it represents both trailing and wrap-around embodiments.

Near the ABS, the nonmagnetic gap layer 256 has a reduced thickness and forms a shield gap throat 258. The throat gap width is generally defined as the distance between the write pole 220 and the magnetic shield 250 at the ABS.

The shield 250 is formed of magnetically permeable material (such as Ni, Co and Fe alloys) and gap layer 256 is formed of nonmagnetic material (such as Ta, TaO, Ru, Rh, NiCr, SiC or $Al_2O_3$). A taper 260 in the gap material provides a gradual transition from the throat gap width at the ABS to a maximum gap width above the taper 260. This gradual transition in width forms a tapered bump in the non-magnetic gap layer that allows for greater magnetic flux density from the write pole 220, while avoiding saturation of the shield 250.

It should be understood that the taper 260 may extend either more or less than is shown in FIG. 2. The taper may extend upwards to an end of shield 250 opposite the ABS (not shown), such that the maximum gap width is at the end of the shield opposite the ABS. The gap layer thickness increases from a first thickness (the throat gap width) at the ABS to greater thicknesses at a first distance from the ABS, to a final thickness at a second distance (greater than the first distance) from the ABS.

Figure 3A:
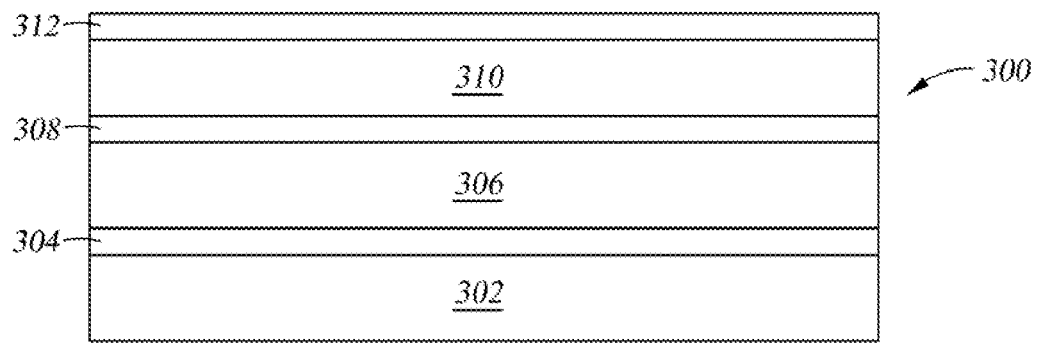
FIGS. 3A-3K illustrate the process of making a magnetic read head according to one embodiment.

FIGS. 3A-3K illustrate the process of making the magnetic read head 211 according to one of the embodiments. FIG. 3A is an ABS view of a sensor stack 300. The sensor stack 300 includes a shield 302, a seed layer 304 formed on the shield 302, a pinned layer 306 formed on the seed layer 304, a barrier layer 308 formed on the pinned layer 306, a free layer 310 formed on the barrier layer 308 and a capping layer 312 formed on the free layer 310. The shield 302 may be the shield S1 and may comprise a ferromagnetic material. Suitable ferromagnetic materials that may be utilized include Ni, Fe, Co, NiFe, NiFeCo, NiCo, CoFe and combinations thereof. The seed layer 304 may comprise Ta or Ru. The pinned layer 306 may be a ferromagnetic layer comprising NiFe, CoFe, CoFeB, Co, CoZr, CoHf or CoFeTaB. The pinned layer 306 may comprise a multilayer structure such as an antiparallel (AP) pinned structure having a first magnetic layer, a second magnetic layer and a nonmagnetic AP coupling layer sandwiched between the two magnetic layers. The first and second magnetic layers may be constructed of several magnetic materials such as, for example NiFe, CoFe, CoFeB, Co, CoZr, CoHf or CoFeTaB. The nonmagnetic layer may comprise Ru.

The barrier layer 308 may comprise an insulating material such as MgO, $TiO_2$ or alumina, or a nonmagnetic material such as Cu, Ag or the like. The free layer 310 may comprise ferromagnetic materials such as Co, CoFe, CoFeB, NiFe, CoHf or combinations thereof. The capping layer 312 may comprise a material such as Ru, Ta or a layered structure of these materials. The layers 304, 306, 308, 310 and 312 may be deposited by physical vapor deposition (PVD), chemical vapor deposition, ion beam deposition (IBD) or any other suitable deposition method.

Figure 3B:
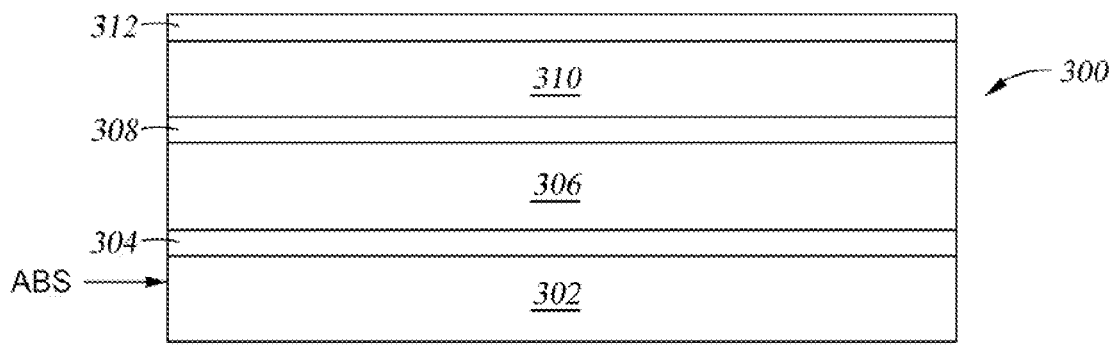
Figure 3C:
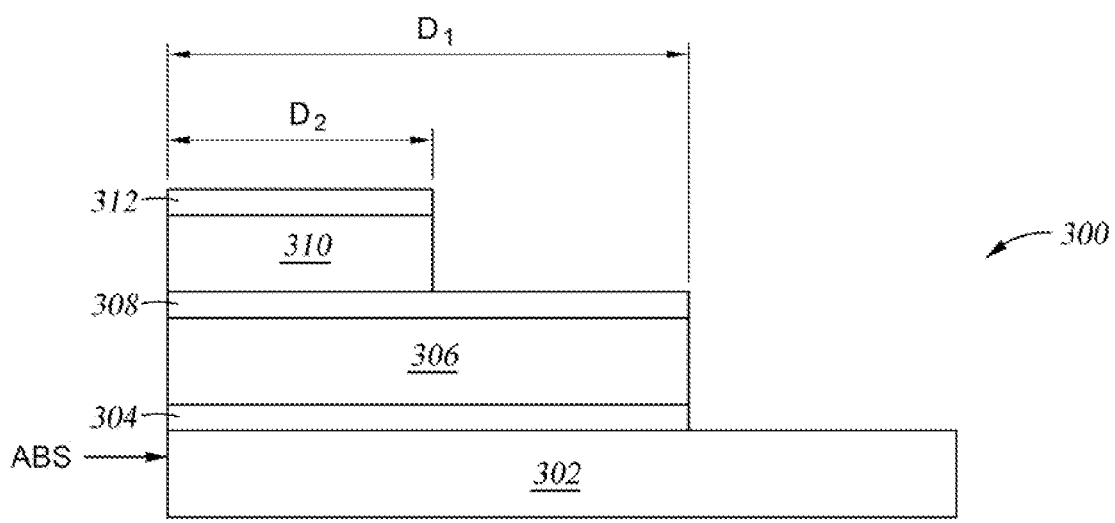

FIG. 3B is a side view of the sensor stack 300 before the stripe height of the free layer 310 and the pinned layer 306 have been defined. Next, as shown in FIG. 3C, a portion of the seed layer 304, a portion of the pinned layer 306 and a portion of the barrier layer 308 have been removed to expose a portion of the shield 302. The removal process may include one or more suitable removal processes, such as reactive ion etching (RIE) and/or ion milling. As a result of the removal process, the stripe height of the pinned layer 306 is defined, indicated as "D1" in FIG. 3C. A portion of the free layer 310 and a portion of the capping layer 312 have been removed to expose a portion of the capping layer 308. The removal process may include one or more suitable removal processes, such as RIE and/or ion milling. As a result of the removal process, the stripe height of the free layer 310 is defined, indicated as "D2" in FIG. 3C. The pinned layer 306 may have the same stripe height as the free layer 310, or may have a greater stripe height than the free layer 310, as shown in FIG. 3C. The etching steps that remove the pinned layer 306 and the seed layer 304 in order to define "D1" may be performed either before or after the steps enumerated in the following paragraphs that define the track widths of the side-by-side sensors.

Figure 3D:
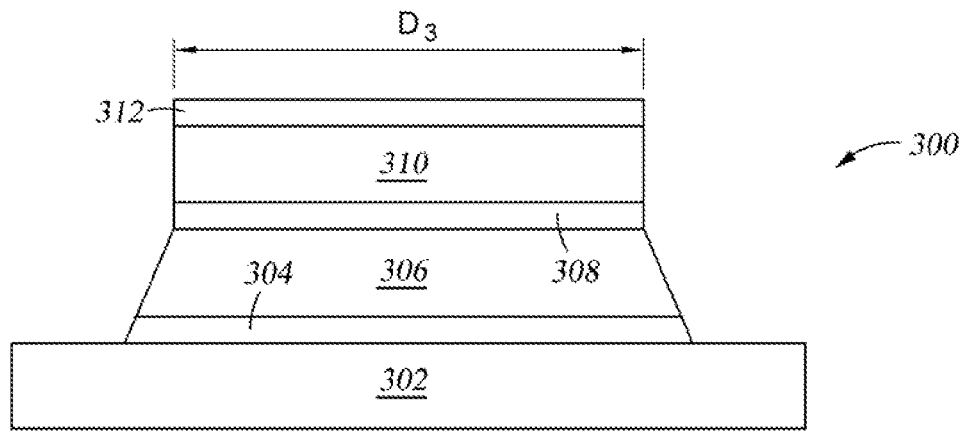

FIG. 3D shows an ABS view of the sensor stack 300 according to one embodiment. After the stripe heights of the pinned layer 306 and the free layer 310 have been defined, portions of the capping layer 312, the free layer 310, the barrier layer 308, the pinned layer 306 and the seed layer 304 are removed to expose portions of the shield 302. The removal process may include one or more suitable removal processes, such as RIE and/or ion milling. As a result of the removal process, the track width of the combined sensors is defined, indicated as "D3" in FIG. 3D. The combined track width "D3" may be about 100 nm. In some embodiments, the track width "D3" of the combined sensors is defined before the stripe heights of the pinned layer 306 and the free layer 310 are defined.

Figure 3E:
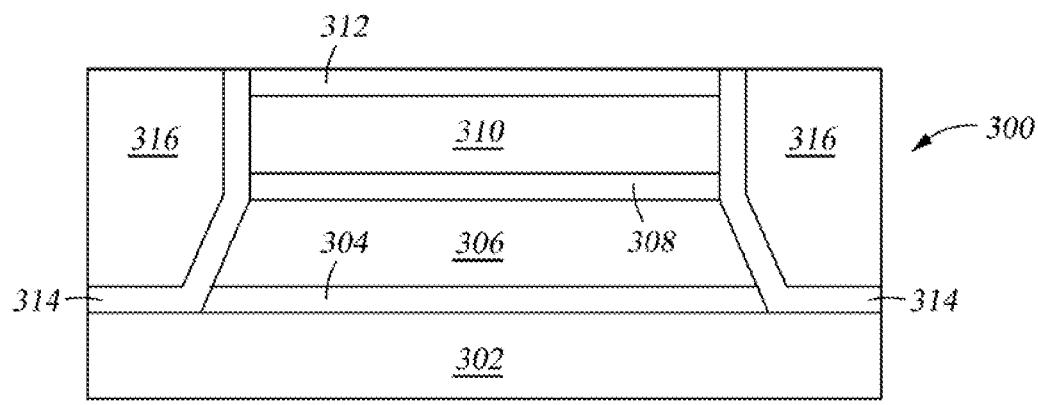

A bias material 316 is then deposited over the exposed portions of the shield 302, as shown in FIG. 3E. The bias material 316 may be a hard or soil bias comprising a material having a high magnetic moment such as CoFe or NiFe. An insulating layer 314 may be first deposited on the exposed portions of the shield 302 and then the bias material 316 is deposited on the insulating layer 314. The insulating layer 314 may be made of an insulating material such as alumina, silicon nitride, silicon dioxide, tantalum oxide or other suitable materials. Without the insulating layer 314, the metal bias layer would short out the device. An optional bias capping layer may be deposited over the bias material 316.

Figure 3F:
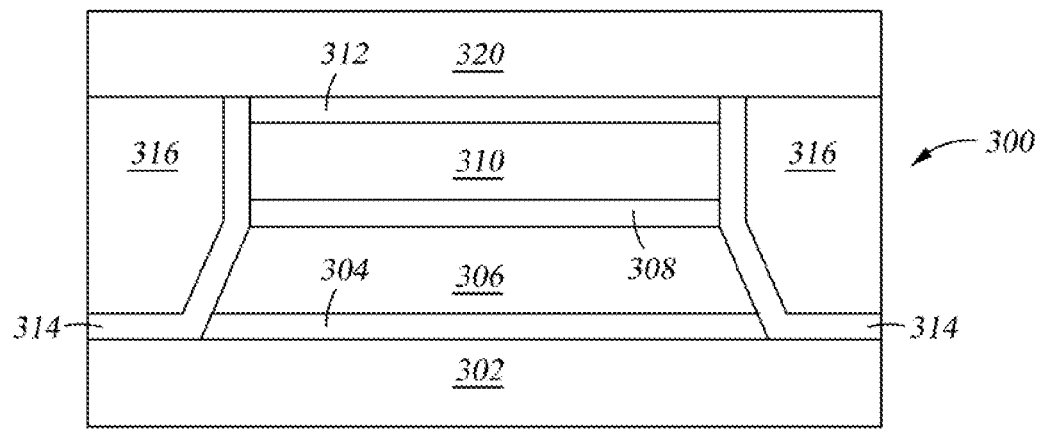
Figure 3G:
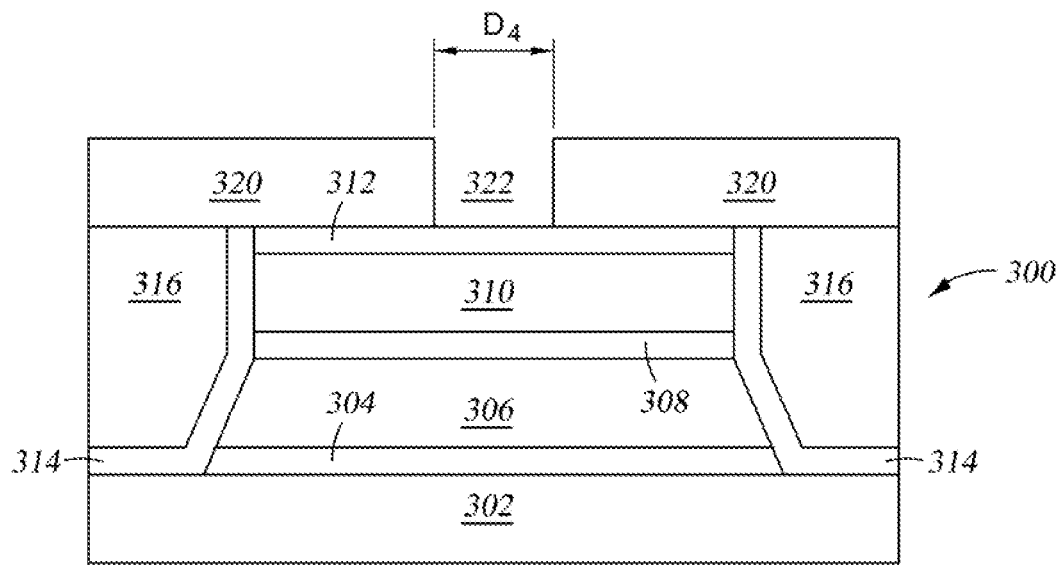

Next, a hard mask layer 320 is deposited over the bias 316 and the capping layer 312, as shown in FIG. 3F. The hard mask layer 320 may be as thin as possible to minimize shadowing. In one embodiment, the hard mask layer 320 comprises diamond like carbon (DLC) and is about 10-50 nm thick. An opening 322 is formed in the hard mask layer 320, as shown in FIG. 3G. The opening 322 may be formed by removing a portion of the hard mask layer 320 with an RIE to expose a portion of the capping layer 312. The opening 322 may have a width "D4" that is 30 nm or smaller, and may be located above the center portion of the free layer 310.

Figure 3H:
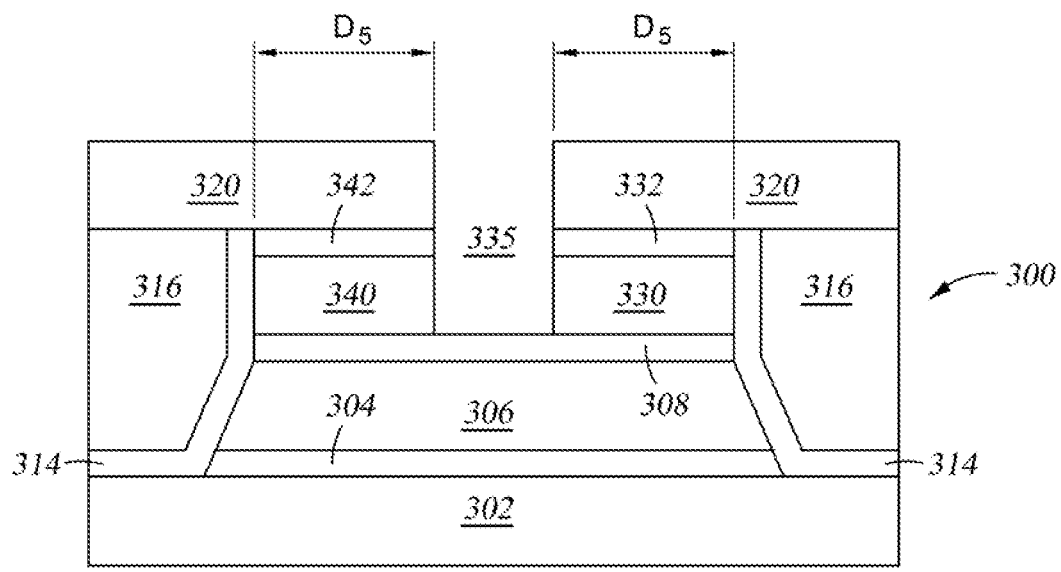

The exposed portion of the capping layer 312 and the center portion of the free layer 310 that is disposed below the exposed portion of the capping layer 312 are removed, forming an opening 335 as shown in FIG. 3H. The removal process may include ion milling of the capping layer 312 and the free layer 310, or ion milling the capping layer 312 and then RIE the free layer 310 using methanol. Because the hard mask layer 320 is very thin, shadowing is minimized and optimal controlling of this precise milling step is achieved. As a result of the removal process, the center portion of the free layer 310 has been completely removed, exposing the underlying portion of the barrier layer 308 and creating two free layers 330, 340 having substantially identical track width "D5". Each free layer 330, 340 has a capping layer 332, 342 disposed thereon, respectively. The barrier layer 308 may be resistant to ion milling, creating a generous operating window for the complete separation of the free layers 330, 340. It may be desirable to not mill through the barrier layer 308, so shunting issues may be avoided. In one embodiment, the track width "D5" of the two free layers 330, 340 is about 20 nm to 45 nm. In one embodiment, the track width "D5" of the free layers 330, 340 is greater than the stripe height of the free layers 330, 340.

Figure 3I:
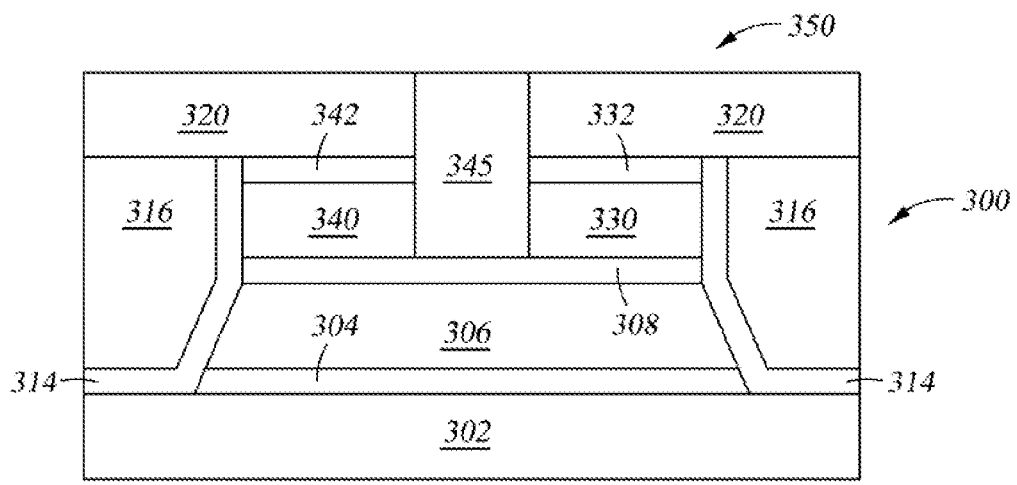

Next, an insulative nonmagnetic material 345 is deposited in the opening 335, as shown in FIG. 3I. The insulative nonmagnetic material 345 may be alumina, TaO, SiN, combinations thereof, or other suitable insulative nonmagnetic materials, and may be deposited by IBD). A top surface 350 may be planarized by a chemical mechanical polishing (CMP) process.

Figure 3J:
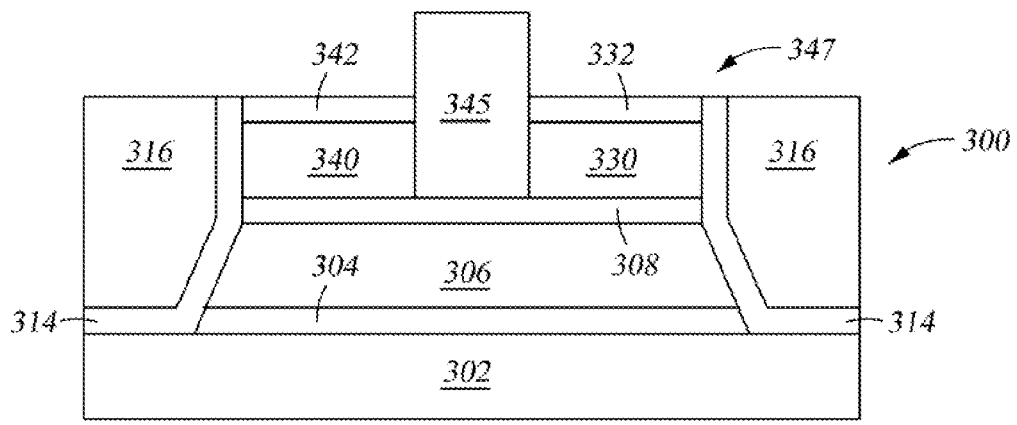
Figure 3K:
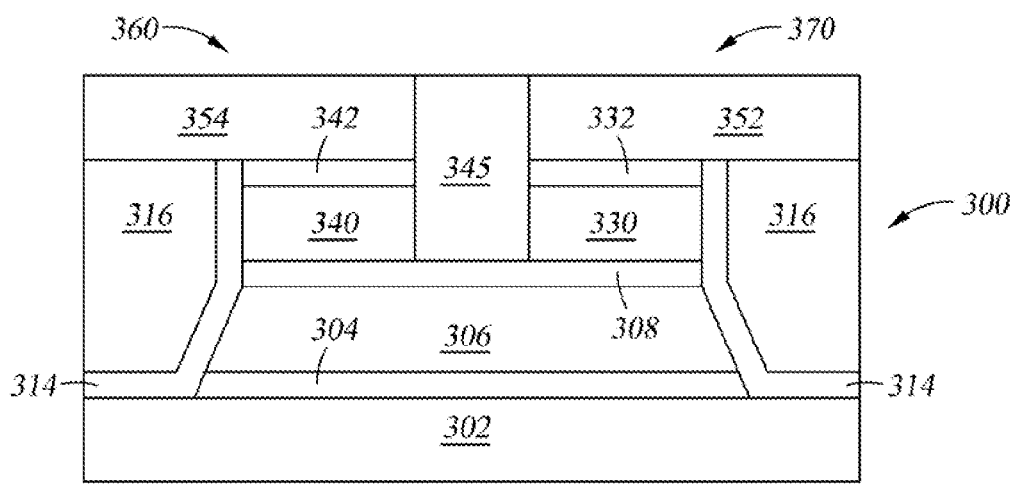

The hard mask layer 320 is then removed by any suitable removal process, such as RIE, leaving a portion of the insulative nonmagnetic material 345 protruding out of a top surface 347, as shown in FIG. 3J. Next, leads 352, 354 are deposited on the top surface 347 and adjacent the protruded portion of the insulative nonmagnetic material 345. The leads 352, 354 may be any suitable metal such as Ta, Rh, W, or multilayer structure of suitable metals such as a three layer structure having an Rh layer sandwiched between two Ta layers. In one embodiment, the leads 352, 354 are made of one or more refractory hard metals to avoid smearing during one or more subsequent CMP processes. In another embodiment, the leads 352, 354, or some portions of them, are made of a soft magnetic material to act as a top shield to the sensors. Different processes may be used to form the leads 352, 354. In one embodiment, a lead layer is deposited on the top surface 347 and the insulative nonmagnetic material 345, and a chemical mechanical kiss polish may be performed to remove the portion of the lead layer that is deposited on the insulative nonmagnetic material 345, leaving the lead layers 352, 354. In another embodiment, a lead layer is deposited on the top surface 347 and the insulative nonmagnetic material 345, and resists are formed on the portions of the lead layer that would be the lead layers 352, 354. The portion of the lead layer that is not covered by the resists is removed by an ion milling process, and the resists are then lifted off, leaving the lead layers 352, 354. In yet another embodiment, a resist is formed on the insulative nonmagnetic material 345, and a lead layer is deposited on the top surface 347 and the resist. The resist and the portion of the lead layer disposed thereon are removed by a lift off process, leaving the lead layers 352, 354.

FIGS. 3A-3K illustrate a method for forming side by side sensors 360, 370. The sensors 360, 370 each has its own lead 354, 352, capping layer 342, 332 and free layer 340, 330, respectively. The sensors 360, 370 share the barrier layer 308 and the pinned layer 306. The side by side sensors 360, 370 may be used for multiple input multiple output (MIMO) recording which helps decreasing noise and improving sensitivity. FIGS. 4A-4E illustrate another method for forming the side by side sensors for MIMO recording.

Figure 4A:
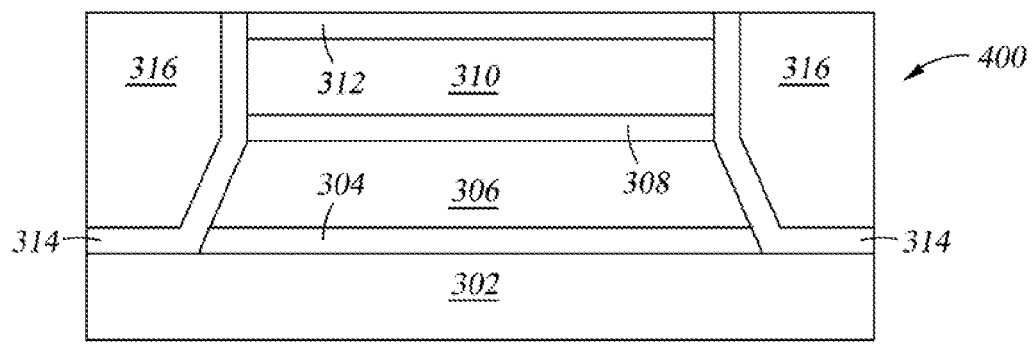
FIGS. 4A-4E illustrate the process of making the magnetic read head according to one embodiment.
Figure 4B:
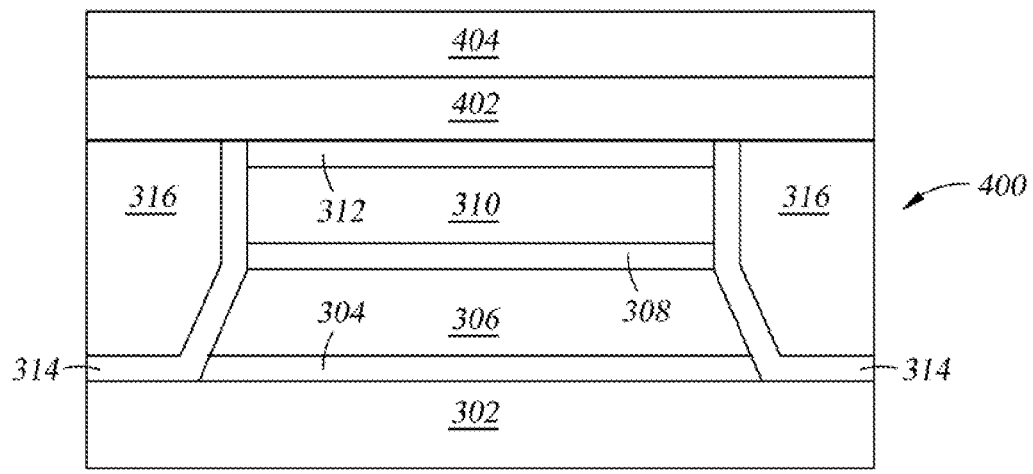

FIG. 4A shows the sensor stack 400 that is identical to the sensor stack 300 described in FIG. 3E. Next, a lead layer 402 is formed on the bias material 316 and the capping layer 312, and a hard mask layer 404 is formed on the lead layer 402, as shown in FIG. 4B. The lead layer 402 may comprise the same material as the lead layers 352, 354. In one embodiment, the lead layer 402 comprises W, which is a RIEable metal. The hard mask layer 404 may comprise the same material as the hard mask layer 320. The lead layer 402 and the hard mask layer 404 may be deposited by any suitable deposition method, such as PVD, CVD or IBD. The lead layer 402 and the hard mask layer 404 may have a combined thickness of about 10-60 nm, and the lead layer 402 may have a thickness that is less than 15 nm in order to minimize the distance between the free layers 330, 340 and a top shield disposed over the lead layer 402. Although the thickness constraint of the lead layer 402 may be relaxed if materials are chosen so that the lead layer 402 provides shielding to the free layers 330, 340.

Figure 4C:
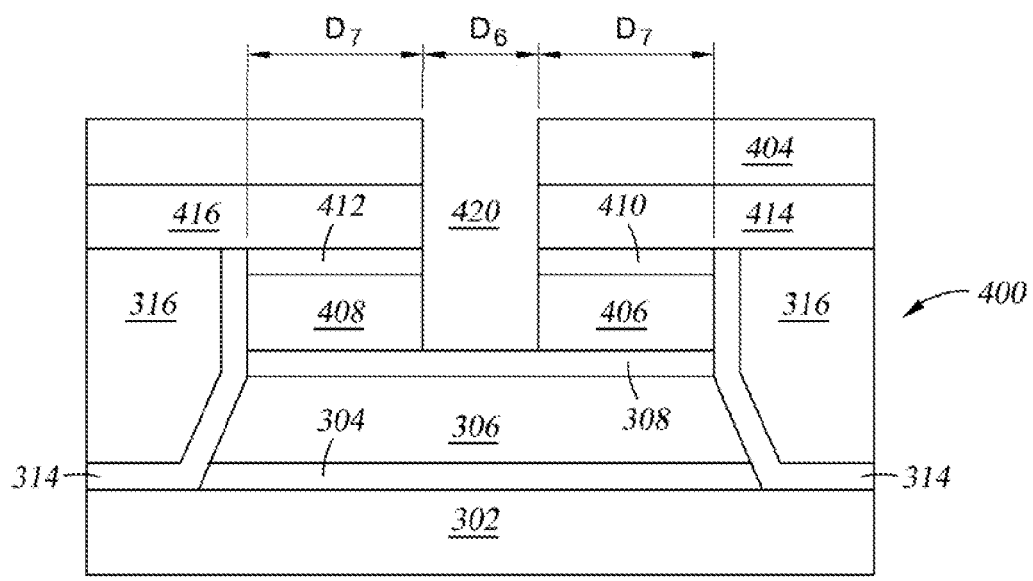

Next, as shown in FIG. 4C, an opening 420 is formed in the hard mask layer 404, the lead layer 402, the capping layer 312 and the free layer 310, forming two lead layers 414, 416, two capping layers 410, 412, and two free layers 406, 408. The opening 420 may be formed by one or more removal processes. In one embodiment, an opening is first formed in the hard mask layer 404 by an RIE process, and then portions of the lead layer 402, capping layer 312 and free layer 310 are removed by ion milling to expose the underlying portion of the barrier layer 308 and to form the opening 420. In one embodiment, the portion of the lead layer 402 is removed by RIE, the portion of the capping layer 312 is removed by ion milling, and the free layer 310 is removed by RIE. The opening 420 is formed in the center of the free layer 310. The opening 420 may have a width "D6" of about 30 nm and the free layers 406, 408 each has a width "D7" of about 35 nm.

Figure 4D:
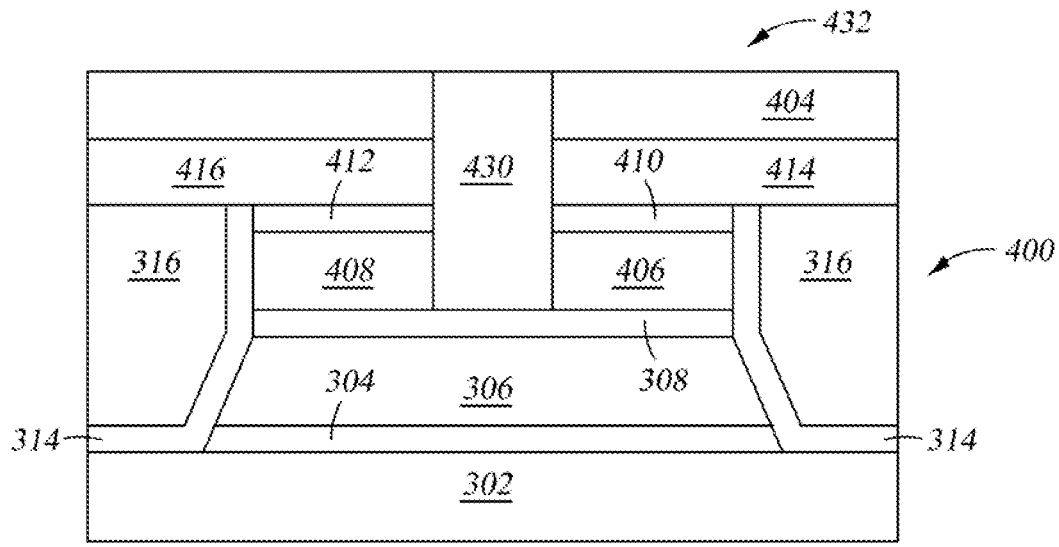
Figure 4E:
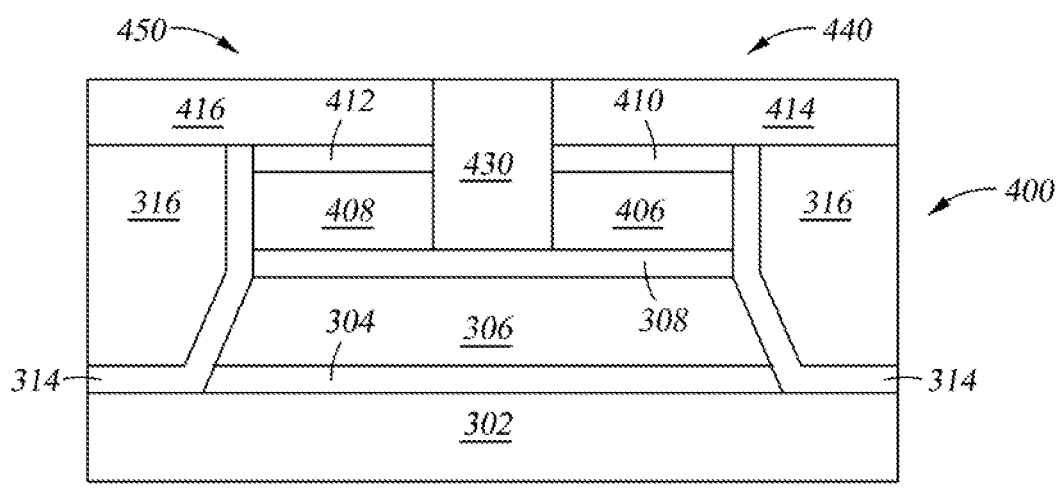

An insulative nonmagnetic material 430 is deposited in the opening 420, as shown in FIG. 4D. The insulative nonmagnetic material 430 may comprise the same material as the insulative nonmagnetic material 345. The deposition of the insulative nonmagnetic layer 430 may be any suitable deposition method, such as IBD. A top surface 432 of the sensor stack 400 may be planarized by CMP. Next, the hard mask layer 404 is removed by any suitable removal method, such as RIE, and the portion of the insulative nonmagnetic material 430 that is protruding above the lead layers 414, 416 is etched back, as shown in FIG. 4E. Again the resulting structure has two side by side sensors 440, 450, each having its own lead layers 414, 416, capping layers 410, 412 and free layers 406, 408, respectively. The two sensors 440, 450 share the barrier layer 308 and the pinned layer 306.

In summary, a method for forming a magnetic read head having side by side sensors is disclosed. The method includes depositing a pinned layer, a barrier layer and a free layer over a shield, and defining a total track width by removing portions of the pinned layer, barrier layer and the free layer, exposing portions of the underlying shield. A bias material is formed over the exposed portions of the shield. A portion of the free layer is replaced with an insulative nonmagnetic material, forming two separate free layers. The side by side sensors each has its own free layer and share the pinned layer.

While the foregoing is directed to embodiments of the present invention, other and further embodiments of the invention may be devised without departing from the basic scope thereof, and the scope thereof is determined by the claims that follow.

What is claimed is:

1. A magnetic read head for multiple input multiple output recording, comprising:
    side by side sensors, including:
        a shield;
        a pinned layer disposed over a first portion of the shield;
        a barrier layer disposed over the pinned layer;
        a first free layer disposed over a first portion of the barrier layer;
        a second free layer disposed over a second portion of the barrier layer;
        an insulative nonmagnetic material disposed over a third portion of the barrier layer;
        a first lead layer disposed over the first free layer; and
        a second lead layer disposed over the second free layer.

2. The magnetic read head of claim 1, further comprising a first sensor and a second sensor, wherein the first sensor includes the pinned layer, the barrier layer, the first free layer and the first lead layer, and wherein the second sensor includes the pinned layer, the barrier layer, the second free layer and the second lead layer.

3. The magnetic read head of claim 2, wherein the first and second free layers each has a track width ranging from about 20 nm to about 45 nm.

4. The magnetic read head of claim 2, wherein the insulative nonmagnetic material has a width of less than or equal to 30 nm.

5. The magnetic read head of claim 1, further comprising:
a bias material disposed over a second portion and a third portion of the shield.

6. The magnetic read head of claim 1, further comprising a seed layer disposed over the first portion of the shield, wherein the pinned layer is disposed over the seed layer.

* * * * *